United States Patent [19]

Wedam et al.

[11] Patent Number: 4,588,929

[45] Date of Patent: May 13, 1986

[54] POWER SUPPLY AND DEFLECTION CIRCUIT PROVIDING MULTIPLE SCAN RATES

[75] Inventors: Werner F. Wedam, Lawrenceville; William E. Babcock, Warren; Julian M. Schmoke, Jr., Plainsboro, all of N.J.

[73] Assignee: RCA Corporation, Princeton, N.J.

[21] Appl. No.: 497,950

[22] Filed: May 25, 1983

[51] Int. Cl.[4] .......................... H01J 29/70; H01J 29/56
[52] U.S. Cl. ...................................... 315/395; 315/371
[58] Field of Search ................. 315/395, 396, 397, 371

[56] References Cited

U.S. PATENT DOCUMENTS

| | | | |
|---|---|---|---|
| 3,582,706 | 6/1971 | Thomas | 315/27 |
| 3,784,872 | 1/1974 | James | 315/27 TD |
| 3,786,303 | 1/1974 | Hilburn | 315/27 |
| 3,816,792 | 6/1974 | Spencer, Jr. | 315/27 |
| 3,887,842 | 6/1975 | Owens, Jr. et al. | 315/397 |
| 4,302,708 | 11/1981 | Spilsbury | 315/389 |
| 4,353,013 | 10/1982 | Lehman | 315/387 |
| 4,501,995 | 2/1985 | Olmstead et al. | 315/371 |

FOREIGN PATENT DOCUMENTS 871559 6/1961 United Kingdom .

OTHER PUBLICATIONS

Schematic of Scan Borad for Conrac Video Monitor, Dated 3/17/81.
Conrac Technical Manual 7111/7211 RGC Color Monitor.

Primary Examiner—Theodore M. Blum
Assistant Examiner—Gregory C. Issing
Attorney, Agent, or Firm—Paul J. Rasmussen; Joseph Laks; Scott J. Stevens

[57] ABSTRACT

A power supply and deflection circuit for a video monitor provides multiple horizontal scan rates. A switch is used to select the desired scan rate. Operation of the switch determines the proper operating voltage level for the horizontal deflection circuit. A zener diode provides a high or low signal in response to the level of the determined operating voltage. The horizontal oscillator frequency and the value of the S-shaping capacitor is determined in response to the high or low signal. The operation of the switch, therefore, provides the necessary circuit parameter changes for each of the horizontal scan rates selected.

9 Claims, 3 Drawing Figures

POWER SUPPLY AND DEFLECTION CIRCUIT PROVIDING MULTIPLE SCAN RATES

This invention relates to power supply and deflection circuits for video display systems and in particular to horizontal deflection circuits which can operate at different scan rates.

The growing popularity of computers and word processing systems, particularly for home or small business use, requires some form of video information display. An ordinary television receiver is sufficient for some applications, but obtaining the desired readability in the reproduction of text and numbers often requires more resolution than a television receiver can provide. In particular, vertical resolution may be improved by increasing the number of horizontal raster lines. Flicker, line breakup and line crawl may be improved by providing a line by line or progressive scan, rather than an interlaced scan. A progressive scan system normally provides an increase in the horizontal deflection rate. If the horizontal scanning rate is doubled, the vertical deflection rate may be left unchanged. This is particularly important in the personal computer market, where a dedicated monitor may not be economically feasible. It may be desirable to utilize a single unit as a combined receiver/monitor that is capable of providing high resolution for computer or word processing functions and normal video display for ordinary receiver operation. The capability of multiple horizontal scan rates may also be desirable in order to enhance the applicability of a monitor with various software systems that specify particular scanning rates.

In order to fully realize the benefit of using common circuits for multiple scan rate operation, it is important that the monitor performs to the same specifications with each horizontal scanning rate provided. This may require that some circuit parameters, such as operating voltages, be dependent on the horizontal frequency or rate that is selected. The amount of deflection distortion correction provided may also be dependent on deflection rate and must be controlled appropriately. It is also desirable to perform the previously described changes or compensations as efficiently and automatically as possible, to reduce the complexity to the user in selecting the desired mode of operation.

In accordance with an aspect of the invention, a deflection circuit for use in a video signal display system comprises a power supply which selectively provides first and second regulated voltage levels. An oscillator produces a signal of a first frequency in response to the first voltage level and of a second frequency in response to the second voltage level. Deflection means produces a deflection signal of a first deflection rate in response to the first oscillator frequency signal and of a second deflection rate in response to the second oscillator frequency signal. Linearity correcting circuitry is connected to the deflection means and provides a first amount of linearity correction to the deflection signal in response to the first voltage level and a second amount of linearity correction to the deflection signal in response to the second voltage level.

In the accompanying drawing.

Figure 1:
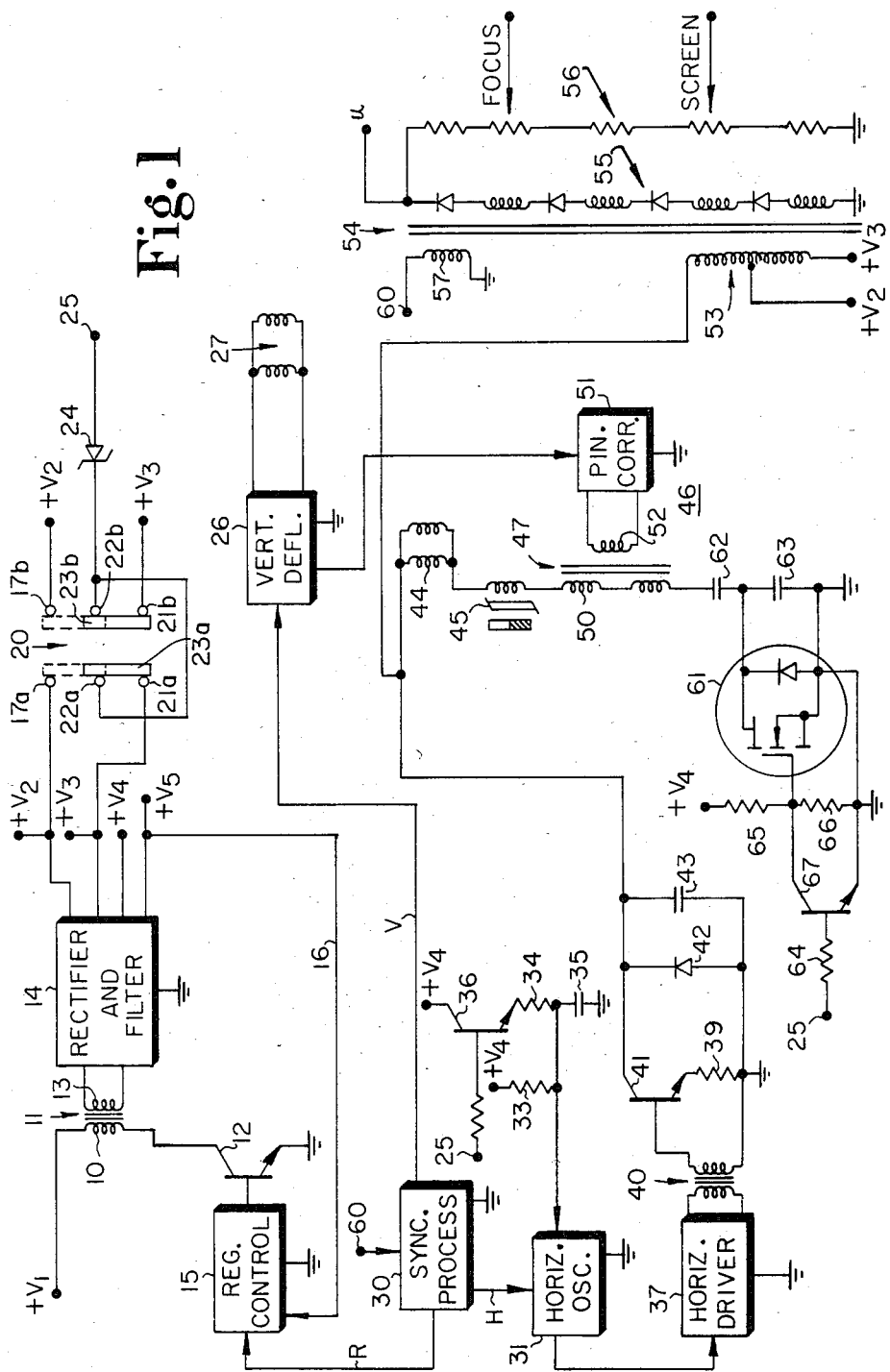
FIG. 1 is a schematic and block diagram of a power supply and deflection circuit in accordance with an aspect of the present invention.

Referring to FIG. 1, there is shown a portion of a circuit for a video monitor that operates at two horizontal deflection or scanning frequencies. A source of unregulated direct voltage $+V_1$, of the order of 300 volts dc, developed from an ac mains supply, is applied to a primary winding 10 of a power supply transformer 11. Primary winding 10 is also coupled to the collector of a switching transistor 12 so that conduction of transistor 12 causes current from the $+V_1$ voltage supply to flow in primary winding 10. The voltages induced in the secondary windings of transformer 11, of which one secondary winding 13 is illustratively shown, are rectified and filtered by appropriate circuits 14 to develop a plurality of direct voltages $+V_2$, $+V_3$, $+V_4$ and $+V_5$, which are used to power the circuits of the monitor. The voltage $+V_5$ is shown as being applied to a voltage regulator control circuit 15 via a conductor 16. Regulator control circuit 15 samples the level of the $+V_5$ voltage and controls the conduction duty cycle of transistor 12 by width modulating the gate drive signal for transistor 12. By controlling the conduction of transistor 12 on the basis of the voltage level of the feedback voltage $+V_5$, the level of the direct voltages $+V_2$, $+V_3$, $+V_4$ and $+V_5$ can be accurately regulated. The feedback or sample voltage for regulator control circuit 15 may be taken from a separate supply, as shown, or may be taken from one of the other voltage supplies instead.

The $+V_2$ voltage source is connected to a terminal 17a of one pole of a double pole switch 20. A corresponding terminal 17b is located on the other pole of switch 20. The $+V_3$ voltage source is connected to a terminal 21a of one pole of switch 20, which has a corresponding terminal 21b on its other pole. Common terminals 22a and 22b are located between terminals 17a,b and 21a,b respectively. Common terminal 22a is electrically connected to common terminal 22b. Switch contacts 23a and 23b electrically connect terminals 17a,b and 22a,b in a first position, and electrically connect terminals 21a,b and 22a,b in a second position. As a result, when switch 20 is in its first position, the $+V_2$ voltage level, illustratively of the order of 90 volts dc, will appear at terminals 17b and 22b, and terminal 21b will be disconnected. When switch 20 is in its second position, as shown in FIG. 1, the $+V_3$ voltage level, illustratively of the order of 45 volts, will appear at terminals 22b and 21b, and terminal 17b will be disconnected.

Switch 20 is used to select the desired horizontal scanning frequency, illustratively 31.5 kHz in its first position or 15.75 kHz in its second position. In a manner that will be explained in detail later, switch 20 cooperates with other monitor circuitry to automatically perform each of the necessary parameter changes to provide the desired operation with either scanning frequency.

The voltage that appears at common terminal 22b ($+V_2$ or $+V_3$) is applied to the cathode of a zener diode 24. Zener diode 24 is chosen to avalanche at a voltage level above the level of voltage $+V_3$ and below the level of voltage $+V_2$. When switch 20 is in its first position, presence of voltage $+V_2$ at terminal 22b will cause zener diode 24 to avalanche or break down, resulting in a "high" signal level at terminal 25. When switch 20 is in its second position, voltage $+V_3$ at terminal 22b is insufficient to cause zener diode 24 to break down, and consequently a "low" signal level will appear at terminal 25.

The combination receiver/monitor includes a vertical deflection circuit 26 which provides vertical deflection current to vertical deflection windings 27 of a deflection yoke. The timing or synchronization of vertical deflection circuit 26 is provided by a vertical synchronizing signal via a conductor V from sync processing circuitry 30. Sync processing circuitry 30 provides a signal to regulator control circuit 15 via a conductor R which controls the timing of control circuit 15 in order to synchronize the conduction of transistor 12. Sync processing circuitry 30 also provides a horizontal synchronizing signal to a horizontal oscillator 31 of a horizontal deflection circuit via a conductor H.

The frequency of the output signal of oscillator 31 is determined in the following manner. The oscillator frequency is primarily determined by the value of an external network comprising resistors 33 and 34, capacitor 35, and transistor 36. With switch 20 in its second position (with a 15.75 kHz horizontal scanning frequency selected) the signal level at terminal 25 will be "low", so that transistor 36 is nonconductive. A resistive-capacitive network of resistor 33 and capacitor 35 has component values chosen to produce a frequency for oscillator 31 of slightly less than 15.75 kHz. Oscillator 31 locks onto the desired horizontal rate by way of the synchronizing signal from sync processor 30. When switch 20 is in its first position (with a horizontal scanning rate of 31.5 kHz selected) the signal at terminal 25 will be "high", so that transistor 36 is turned on and becomes conductive. Resistor 34 will then become part of the RC network, providing an additional charge-discharge path for capacitor 35. The value of resistor 34 is chosen so that the time constant of the RC network (resistors 33 and 34 in parallel and capacitor 35) will cause the oscillator frequency to increase, so that oscillator 31 is able to lock on to the desired 31.5 kHz rate in response to the synchronzing signal on conductor H. The value of the capacitance of the RC network could, of course, be changed rather than the resistance. If an LC tuned circuit is used, a parallel inductor could be switched.

The output of horizontal oscillator 31 is applied to a horizontal driver circuit 37 which, via a transformer 40, provides switching signals at the selected horizontal scanning rate to the base of a horizontal output transistor 41. Horizontal output transistor 41 comprises part of a horizontal output circuit that also includes a current limiting resistor 39, a damper diode 42, retrace capacitor 43 and horizontal deflection yoke windings 44. In series with yoke windings 44 is a magnetically biased saturable inductor 45 which provides raster linearity correction that compensates for energy losses during the latter part of each horizontal scan line. Side or east-west pincushion raster distortion is corrected by a pincushion correction device 46 incorporating a transformer 47 having a winding 50 in series with yoke windings 44. The horizontal deflection current flowing in transformer winding 50 is modified at the vertical rate by a signal generated by pincushion correction circuit 51 which receives an input from vertical deflection circuit 26. This correction signal is applied to control winding 52 of transformer 47, which modulates the inductance of winding 50 and hence modifies the deflection current flowing in winding 50.

The geometry of the kinescope or video display tube results in a nonlinear distortion of the scanned raster near the beginning and end of each horizontal scan line. In order to correct this nonlinearity, a capacitor is normally placed in series with the horizontal yoke windings. The capacitor charges during one portion of the horizontal scan interval and discharges during another portion, resulting in an S-shaping modification of the horizontal scanning current that produces the appearance of a linear scan.

The operating voltage of the horizontal output circuit is dependent upon the selected horizontal scan rate or frequency. In order to maintain the same peak to peak yoke current at 15.75 kHz and 31.5 kHz, the operating voltage of horizontal deflection output circuit at 31.5 kHz must be approximately twice the operating voltage at 15.75 kHz. This operating voltage is applied to the horizontal output circuit via a winding 53 of a high voltage transformer 54. As a result of the selected position of switch 20, either the $+V_2$ voltage or the $+V_3$ voltage will be applied to winding 53 and hence to the horizontal deflection output circuit.

The horizontal retrace pulses at the collector of horizontal output transistor 41 appear across winding 53 and, via transformer action, generate the desired high voltage level across the secondary winding 55. Secondary winding 55 comprises a plurality of winding segments separated by rectifying diodes. The high voltage or ultor potential for the kinescope or video display tube appears at an ultor terminal U. A resistor array 56 provides taps for focus and screen voltages used by the electron gun assembly in the kinescope or display tube. A separate winding 57 samples retrace pulses at the horizontal rate and generates a horizontal rate signal at a terminal 60 which is applied to sync processing circuit 30.

It is desirable to hold the high voltage level relatively constant whether the monitor is operated at 15.75 kHz or 31.5 kHz. If a conmon high voltage transformer and retrace capacitor are used for both the 15.75 kHz and 31.5 kHz operation, the retrace pulse width, and hence retrace time, will be the same at both frequencies. The change in the trace to retrace ratio at 15.75 kHz as compared to 31.5 kHz will be greater than the change in circuit operating voltage, however, resulting in a higher amplitude retrace pulse at 15.75 kHz than at 31.5 kHz. This will tend to cause the high voltage level to increase at 15.75 kHz with respect to 31.5 kHz. In order to maintain the high voltage level constant for both scanning frequencies, the secondary/primary turns ratio is made smaller (tending to produce a slightly lower high voltage level) for 15.75 KHz operation, as described in a copending application Ser. No. 497,953 filed May 25, 1983 now U.S. Pat. No. 4,536,684, in the name of W. E. Babcock, and entitled "Multiple Scan Rate Deflection Circuit Incorporating Scan Compensation". The primary winding 53 of high voltage transformer 54 is tapped so that the number of primary winding turns is different for each of the appropriate operating voltage levels for the horizontal output circuit in response to the selected horizontal scanning rate. This can be seen in FIG. 1 by the different winding tap locations for $+V_2$ and $+V_3$.

The amount of capacitance needed to provide the desired amount of S-shaping is less at 31.5 kHz than at 15.75 kHz since the correcting waveform resonant frequency determined by the yoke inductance and S-shaping capacitor must increase as the scanning frequency increases. An arrangement is shown in FIG. 1 which provides the correct amount of S-shaping capacitance in response to the scanning frequency selection. This arrangement comprises an MOS field effect transistor 61, capacitors 62 and 63, resistors 64, 65 and 66, and transistor 67. The signal at terminal 25 is coupled to the base of transistor 67.

During operation at 15.75 kHz, the signal level at terminal 25 and hence at the gate of transistor 67, is low, therefore keeping transistor 67 nonconductive. This causes the collector of transistor 67 to be high and by action of the voltage divider comprising resistors 65 and 66, causes conduction of transistor 61, thereby bypassing capacitor 63. Capacitor 62 is therefore selected to provide the correct amount of S-shaping correction to the deflection current at 15.75 kHz. During 31.5 kHz operation, the signal level at terminal 25 is high, transistor 67 is conducting, the collector of transistor 67 is low, bringing the gate of MOS transistor 61 low, and turning transistor 61 off. The effective S-shaping capacitor is therefore capactiors 62 and 63 in series. Capacitor 63 is selected so that its value in series with capacitor 62 provides the correct amount of S-shaping correction for the horizontal deflection current at 31.5 kHz. The correct amount of S-shaping and, as previously described, the horizontal oscillator frequency, are therefore determined in response to the level of the deflection circuit operating voltage.

Figure 2:
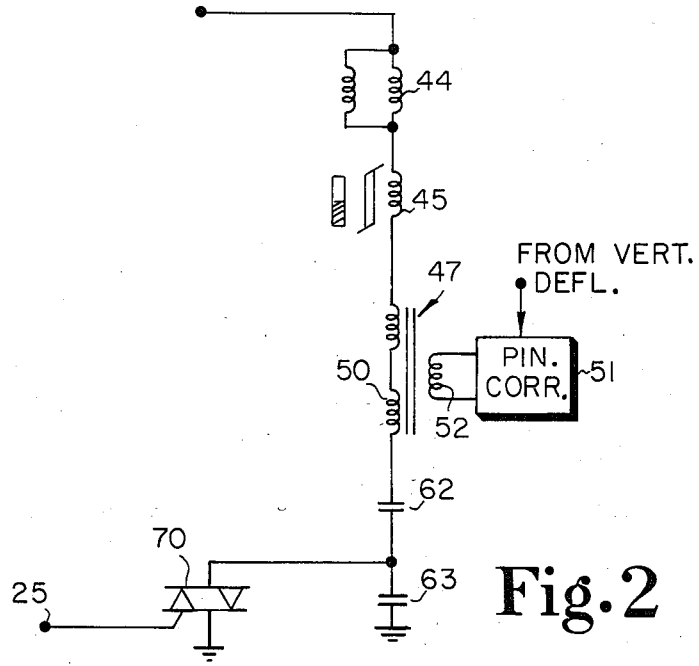
FIG. 2 is a schematic diagram of an embodiment of a portion of the circuit shown in FIG. 1.
Figure 3:
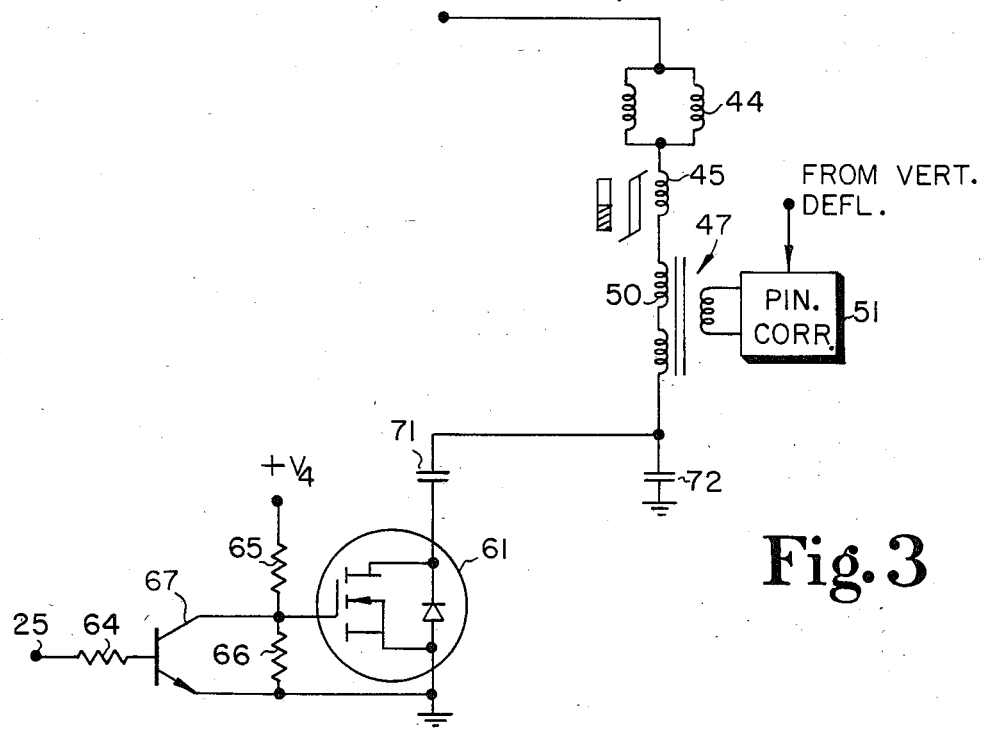
FIG. 3 is a schematic diagram of another embodiment of a portion of the circuit shown in FIG. 1.

FIG. 2 illustrates an alternate embodiment of the S-shaping arrangement of FIG. 1, in which a triac 70 is used in place of MOS transistor 61. Although not illustrated, a bipolar transistor and a diode (if needed to satisfy linearity requirements) could also be used. FIG. 3 illustrates an arrangement in which S-shaping capacitors 71 and 72 are arranged in parallel rather than series to reduce the current carried by the MOS transistor. This arrangement of course would use both capacitors 71 and 72 at 15.75 kHz and only capacitor 72 at 31.5 kHz.

The previously described video monitor, therefore, by way of a single selection via switch 20, provides the proper horizontal output circuit operating voltage, the desired horizontal oscillator frequency and the correct amount of S-shaping nonlinearity correction for each of the selected horizontal scan rates. Although the circuits have been described with respect to two horizontal scan rates, any number of different scan rates could be provided with the described circuitry operating in a similar manner.

What is claimed is:

1. A deflection circuit including linearity correction automatically adjusted for multiple scan rates for use in a video signal display system comprising:
    a power supply selectively providing first and second supply voltages;
    an oscillator producing an oscillator signal having a first frequency when said power supply produces said first supply voltage and producing said oscillator signal having a second frequency when said power supply produces said second supply voltage;
    deflection means coupled to said oscillator for producing a deflection signal having a first deflection rate in response to said oscillator signal of said first frequency and a second deflection rate in response to said oscillator signal of said second frequency;
    means for generating a bilevel signal having a first level indicative of said first deflection rate when said power supply provides said first supply voltage and having a second level indicative of said second deflection rate when said power supply provides said second supply voltage;
    linearity correcting means incorporating a plurality of linearity-correction components; and
    switching means coupled to said linearity correcting means and having a control terminal coupled to said bilevel signal generating means and responsive to said bilevel signal having said first level for coupling a first number of said linearity-correcting components to said deflection means in order to provide a first amount of linearity correction to said deflection signal and responsive to said bilevel signal having said second level for coupling a second number of said linearity-correcting components to said deflection means in order to provide a second amount of linearity correction to said deflection signal.

2. The arrangement defined in claim 1, wherein said oscillator comprises an external circuit for determining the frequency of oscillation of said oscillator, said external circuit comprising first circuit means for producing a first oscillator frequency, second circuit means producing a second oscillator frequency when coupled to said first circuit means, and switch means for coupling said second circuit means to said first circuit means in response to said second voltage level.

3. The arrangement defined in claim 1, wherein said linearity correcting means comprises a first capacitance coupled to said deflection means, a second capacitance, and switch means for selectively coupling said second capacitance to said first capacitance in response to one of said first and second voltage levels.

4. Linearity correcting means for use in a video display system providing multiple horizontal deflection rates incorporating a power supply selectively providing first and second voltage levels and deflection means for producing a deflection current in a deflection winding having a first horizontal deflection rate when said power supply produces said first voltage level and a second deflection rate when said power supply produces said second voltage level, said linearity correcting means comprising:
    first capacitance means coupled to said deflection winding;
    second capacitance means coupled to said first capacitance means such that said deflection current flows in series through said deflection winding, said first capacitance means, and said second capacitance means when said power supply produces said first voltage level; and
    switch means coupled across said second capacitance for bypassing current flow through said second capacitance means when said power produces said second voltage level.

5. The arrangement defined in claim 4, wherein said switch means comprises an MOS transistor.

6. The arrangement defined in claim 4, wherein said switch means comprises a triac.

7. The arrangement defined in claim 4, wherein said switch means comprises a bipolar transistor.

8. The arrangement defined in claim 4, wherein said first and second capacitances are coupled in series, and said switch means causes said second capacitance to be bypassed in response to said first voltage level.

9. The arrangement defined in claim 4, wherein said first and second capacitances are coupled in parallel, and said switch means causes said second capacitance to be bypassed in response to said second voltage level.

* * * * *